United States Patent [19]

Burgher et al.

[11] Patent Number: 4,496,821

[45] Date of Patent: Jan. 29, 1985

[54] TRANSFORMER FOR ROBOT ARMS

[75] Inventors: Peter H. Burgher; Raymond F. Marsden, both of Howell, Mich.

[73] Assignee: Marelco Power Systems, Inc., Howell, Mich.

[21] Appl. No.: 405,987

[22] Filed: Aug. 6, 1982

[51] Int. Cl.³ .................. B23K 11/24; H01F 27/02
[52] U.S. Cl. ...................... 219/116; 219/90; 336/96
[58] Field of Search .............. 336/96; 219/86.25, 89, 219/90, 116

[56] References Cited

U.S. PATENT DOCUMENTS

| | | | |
|---|---|---|---|
| 3,523,272 | 7/1968 | Jost et al. | 336/133 |
| 3,525,063 | 8/1970 | Wahlgren | 336/96 |
| 3,558,850 | 1/1971 | Leathers | 219/116 |
| 3,691,493 | 9/1972 | Boysen et al. | 336/96 |
| 3,763,344 | 10/1973 | Okabe et al. | 219/116 |
| 4,024,370 | 5/1977 | Sciaky | 219/90 |
| 4,095,206 | 6/1978 | Hishiki | 336/96 |
| 4,179,598 | 12/1979 | Alessio et al. | 219/79 |
| 4,233,488 | 11/1980 | Schwartz | 219/89 |
| 4,249,153 | 2/1981 | Paton et al. | 336/82 |
| 4,310,958 | 1/1982 | Balaud et al. | 219/125.1 |

*Primary Examiner*—Roy N. Envall, Jr.
*Assistant Examiner*—Alfred S. Keve
*Attorney, Agent, or Firm*—Gifford, VanOphem, Sheridan, Sprinkle & Nabozny

[57] ABSTRACT

A transformer for electric welders, especially welders having a welding gun secured to a robot arm, comprises a small lightweight loop core having first and second substantially C-shaped sections abutted together at their free ends with primary and secondary windings coaxially wrapped about one pair of abutting shanks. The secondary winding comprises an elongated flat sheet wrapped around abutting shanks of the core and has projecting tabs extending from opposite sides of the sheet. A primary winding comprising a plurality of coil sections is coaxially wrapped about the secondary winding whereby the secondary winding is substantially entirely coupled to the primary winding. The windings are encapsulated in a dielectric material such as a synthetic polymer resin. The transformer is preferably connected to a high frequency electrical power source.

6 Claims, 4 Drawing Figures

TRANSFORMER FOR ROBOT ARMS

BACKGROUND OF THE INVENTION

I. Field of the Present Invention

The present invention relates generally to electric welding apparatus, and more particularly, to a transformer for use with a welding gun mounted at the end of a robot arm.

II. Description of the Prior Art

While electric welders are well known devices, there is continuing development in the creation and production of automated electric welders. However, it is difficult to apply the previously known welder components in automated devices such as robots for several reasons. For example, very high current must be supplied to the electrodes of a welding gun and it is typical to use a specialized transformer to supply the high currents necessary to form a weld. Conventional spot welder transformers are, therefore, inherently massive and not well adapted for mounting on a displaceable robot arm. Accordingly, the transformers are mounted remotely from the welding gun or fixture and the use of electrical conductors is necessary to electrically connect the transformer to the welding electrodes. These long lengths of conductor introduce large power losses which reduce the effect of welding power at the electrodes. Thus, it becomes necessary to build larger transformers in order to compensate for these losses and supply sufficient current to the electrodes.

A further disadvantage of these large transformers is the great amount of heat generated by these devices. Auxiliary cooling systems, such as a water cooling system, are typically necessary to dissipate the great amount of heat generated in the transformer to produce sufficient welding power at the electrodes of the welding gun. Often, cables from the transformer to the welding gun are also water cooled, adding to the cost, weight and complexity of the system. Such systems increase the weight and complexity of the welding apparatus. Thus, they inhibit the practical incorporation of a welding transformer in a robot arm.

Still another problem in incorporating an electric welder in a robotic arm is that the electrical power source for operating a robot often does not supply enough electrical power to properly provide high enough currents for welding. Accordingly, it becomes necessary to incorporate two electric power sources in such a device or, at least one large power source which increases the complexity and cost of producing such a device.

SUMMARY OF THE PRESENT INVENTION

The present invention overcomes the above disadvantages by providing a lightweight and efficient transformer adapted for incorporation in a displaceable member, such as a robot arm, carrying or adjacent to a welding gun. Due to its high efficiency, the transformer is capable of use with power sources that can be employed to operate robot arms. In addition, its small size and light weight permit it to be mounted at the moving end of a robot arm closely adjacent to the welding gun. At the same time, it does not require auxiliary cooling systems since its small size permits dissipation of heat into the ambient air providing sufficient cooling for the transformer.

The transformer generally comprises a core having two substantially C-shaped sections, each section having parallel, aligned shanks extending outwardly from a base leg. The free ends of the shanks of one section abut against shank ends of the other section and are held together by a nonmagnetic adhesive or butt cement capable of withstanding heat as well as the electromagnetic forces involved in the operation of the primary and secondary coils of the transformer in a manner to be described in greater detail hereinafter.

A secondary coil is wrapped around a first pair of abutting shanks while the primary coil is coaxially wrapped around the secondary coil. Preferably, the secondary coil is coextensive with a primary coil in order to provide optimum coupling of the primary and secondary windings. In the preferred embodiment, the secondary winding comprises a flat sheet wrapped around the core. The flat sheet includes a pair of depending tabs extending from opposite sides of the sheet. The tabs can be used as conductor terminals for conductors secured to the electrodes of a welding gun or, can support the welding electrodes thereon.

The coaxial winding portion of the transformer is encapsulated in an electrically insulating material such as synthetic polymer resin, while in the preferred embodiment, a portion of the core remains exposed outwardly of the encapsulating material to improve heat dissipation from the transformer.

BRIEF DESCRIPTION OF THE DRAWING

The present invention will be more clearly understood by reference to the following detailed description when read in conjunction with the accompanying drawing in which like reference characters refer to like parts throughout the several views, and in which.

DETAILED DESCRIPTION OF A PREFERRED EMBODIMENT OF THE PRESENT INVENTION

Figure 1:
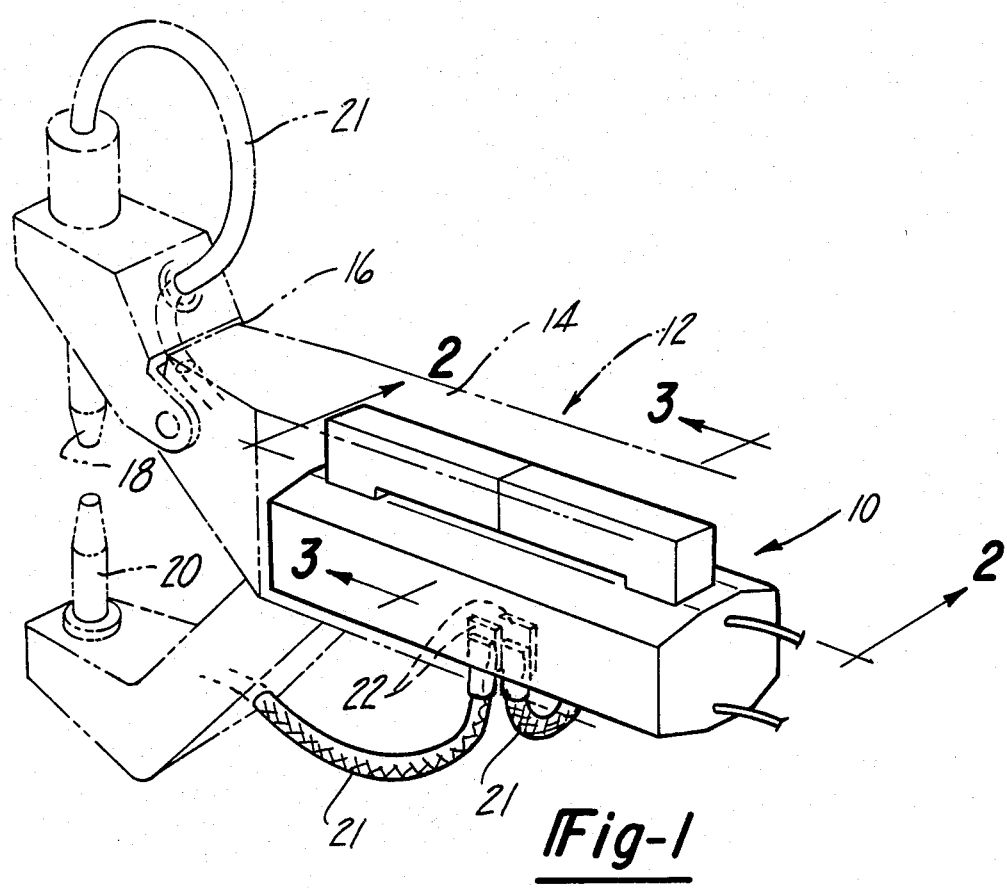
FIG. 1 is a perspective view of a transformer according to the present invention diagrammatically shown in a robot arm.

Referring first to FIG. 1, a transformer 10 according to the present invention is thereshown disposed in a moving end 14 of a robot arm 12 adjacent the welding gun 16. The welding gun 16 includes electrodes 18 and 20. As shown in FIG. 1, the welding gun 16 is disposed at the end of the arm portion 14 so that the electrodes 18 and 20 extend outwardly from the end of the arm. As shown, conductors 21 are attached to the secondary lugs 22. Each lug 22 being connected to an electrode to thereby electrically connect the transformer to the welding electrodes. However, it is to be understood that any type of welding gun can be incorporated in the robot arm and can be utilized with the transformer of the present invention. However, in particular instances, it may be advantageous to secure the welding electrodes directly to the transformer secondary lugs 22 when that position of electrodes is suitable for a particular welding operation. In any case, it will be understood that little, if any, losses are incurred in transmitting the power from the secondary winding of the transformer to the electrodes and thus, such a construction being very close to the work reduces the amount of current which must be generated by the transformer 10. Consequently, the transformer can be very small relative to previously known transformers.

Figure 2:
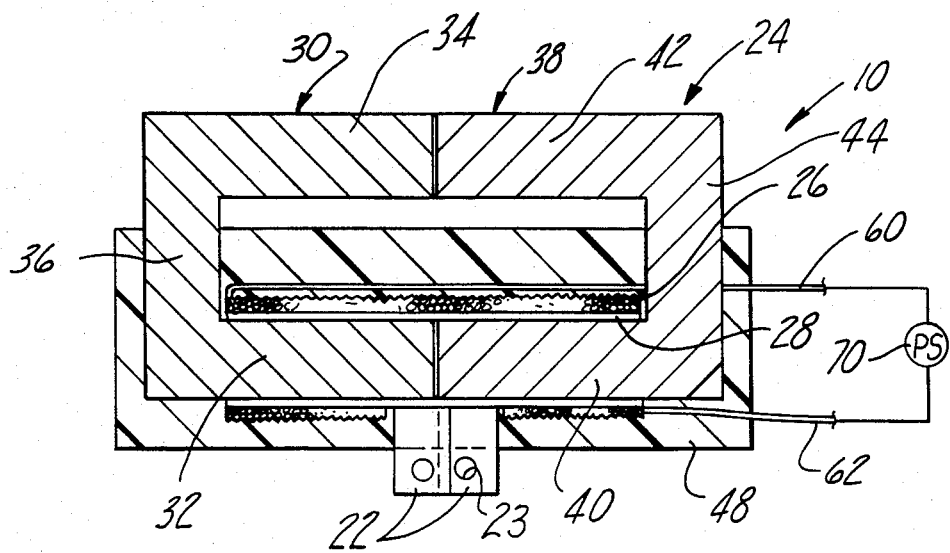
FIG. 2 is a sectional elevation of the transformer shown in FIG. 1.
Figure 3:
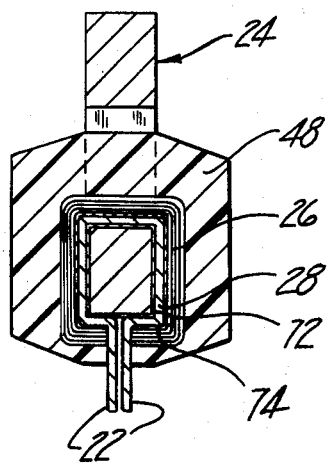
FIG. 3 is a cross-sectional elevation of the transformer shown in FIGS. 1 and 2.

Referring now to FIGS. 2 and 3, the transformer 10 is thereshown comprising a core 24, a primary winding 26 and a secondary winding 28. As best shown in FIG. 2, the core 24 comprises a first section 30 having first and second shanks 32 and 34 extending outwardly from a base leg 36 to form a substantially C-shaped core section. Similarly, a core section 38 comprises shanks 40 and 42 which extend in a parallel alignment outwardly from a base leg 44. The free ends of the shanks 32 and 34 abut against the shanks 40 and 42 respectively so that the core sections 30 and 38 form a loop type core 24.

Figure 4:
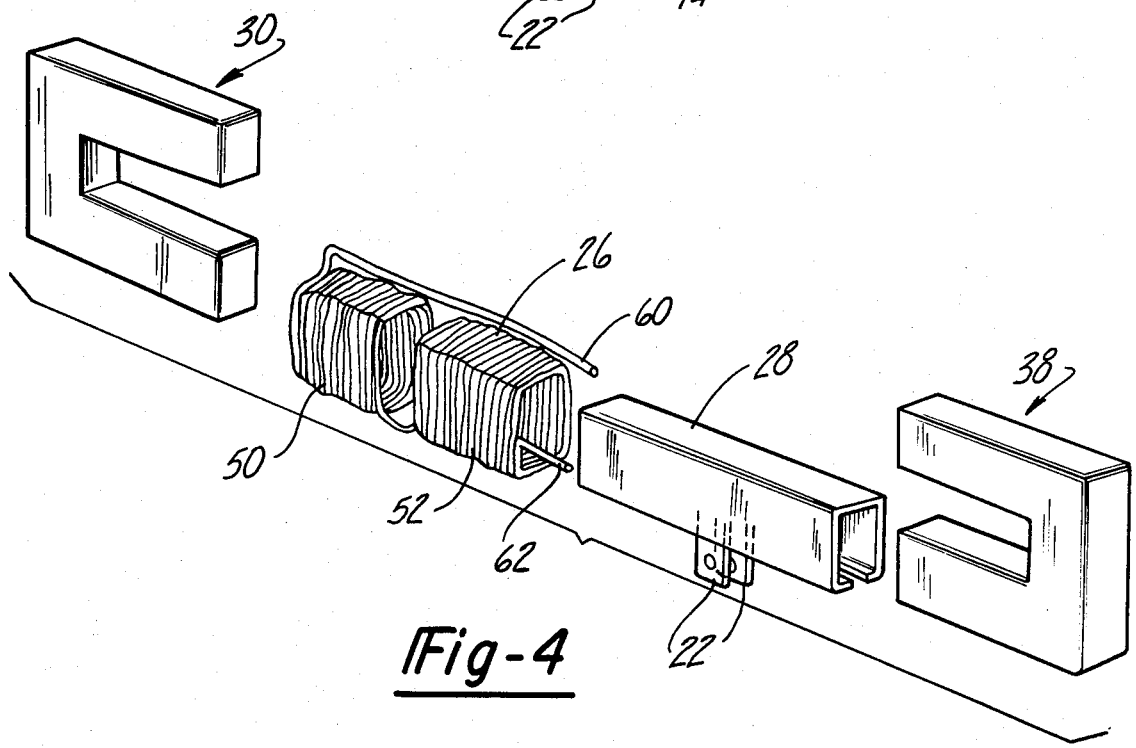
FIG. 4 is an exploded perspective view of a portion of the transformer shown in FIGS. 1 through 3.

As also shown in FIGS. 2 through 4, secondary winding 28 is wrapped around the shanks 32 and 40 of the core sections. The secondary winding comprises an elongated flat sheet extending substantially the length of the shanks 32 and 40 which is wrapped around these core portions. Thus, the secondary winding is substantially a single turn winding. The opposite ends of the flat sheet include the lugs 22 which extend outwardly from the plane of the sheet at those sides. Preferably, the lugs are located at the center of those sides so that electrical current is drawn from the point of optimum current density in the secondary winding resulting from optimum use of the flux pattern obtained by optimum coupling between the primary and secondary winding to further increase efficiency of the transformer.

The primary winding 26 includes a plurality of wire coils which are wrapped around the secondary winding 28. It is to be understood that the primary winding can be formed of several modular sections of coiled wire, such as the electrically interconnected sections 50 and 52 shown in FIG. 4, so that the turns ratio between the primary winding and the secondary winding can be readily adjusted. In any event, the coils of wire of the primary winding extend substantially along the entire secondary winding 28 so as to provide optimum coupling between the primary winding and the single turn secondary winding. As shown in FIG. 4, the sections 50 and 52 are separated slightly to provide a space for the tabs 22 on the secondary winding to extend outwardly from the coaxial primary winding.

The primary winding 26 and the secondary winding 28 are encapsulated together with adjacent portions of the core 24 by an encapsulating material 48 comprising a dielectric compound together with appropriate insulating materials. Preferably, the encapsulating material 48 is a synthetic polymer resin which encases these portions of the transformer. A pair of conductors 60 and 62 extend outwardly through one end of the encapsulating material 48 and extend from the opposite ends of the wire coils wrapped around the primary winding 26 and are, therefore, conveniently directed toward a power supply 70 as shown diagrammatically in FIG. 2. The lugs 22 on the secondary winding extend outwardly through the encapsulating material 48 at the bottom of the transformer 10.

Each of the lugs 22 include appropriate means for connecting a conductor or a welding electrode thereto. For example, as shown in the drawing, the lugs 22 include apertures 23 so that a wire conductor or an electrode body can be bolted to the lugs. (See FIG. 1 for a typical configuration of such conductors 21.)

While as shown in FIG. 4, the wound coil sections of the primary winding can be spaced apart at the center of the secondary winding so that the windings do not interfere with the tabs 22 extending outwardly from the secondary winding, it should be understood that the secondary winding is coupled to the primary winding throughout substantially the entire length of the primary winding. As is also best described with reference to FIG. 4, it can be seen that the transformer is easily constructed by bending the flat sheet of the secondary coil in a loop which receives the shank 32 of the first core section 30. In addition, the primary winding 26, or its separable sections, is easily slid over the secondary winding 28. Of course, a layer of insulation 72 is disposed between the secondary winding 28 and the core while a further insulation layer 74 is disposed between the primary winding and the secondary winding as shown in FIG. 3. The free ends of the shanks 34, 32, 40 and 42 are then coated with appropriate adhesive, and the shank 40 then slid into secondary winding 28 to abut against the shank 32 while the shank 42 abuts against the shank 34. The windings and enclosed core portions are then covered with the encapsulating material 48.

Since the core is split at substantially the center of the coaxial primary and secondary windings, the magnetic field generated by the windings tends to force the free ends of the shanks into abutting contact with each other during operation of the transformer. Thus, the core section is not stressed in a manner which urges these sections to separate or slide with respect to each other. Moreover, the coaxial and substantially coextensive primary and secondary windings provide highly efficient coupling between the windings and prevents the introduction of substantial power losses in the transformer. It can also be seen that while encapsulation of the windings in the insulating material further inhibits power losses in the transformer, a portion of the core extends outwardly from the encapsulating material to increase heat dissipation from the transformer.

Thus, the present invention provides a small lightweight transformer which is operable to provide the high currents necessary for effective welding and which can be conveniently mounted in the moving end of a robot arm. Moreover, such close positioning of the transformer eliminates power losses through conductors between the secondary winding of the transformer and the electrodes of a welding gun. The long and narrow shape of the resulting, substantially lineal, transformer is suitable for incorporation in previously known robot arm configurations.

In addition, the transformer is efficient enough to provide adequate power for welding from electrical power sources which can be used to operate motors that drive the robot arm. In particular, due to the substantial coupling between the secondary and primary windings and other design factors described herein, the transformer is well adapted for high frequency currents. The use of high frequency currents enables a lighter weight transformer to be used. For example, the use of a 400 cycle per second power source as compared to 60 cycle per second source permits the reduction of transformer size by a 6 to 1 ratio. Thus, the 400 cycle per second power supplies utilized in previous power generation equipment for robots is advantageously suited for use with the transformer of the present invention. Moreover, the power supplied can have a 20 percent duty cycle without requiring the need for supplemental cooling of the transformer. Thus, the transformer of the present invention provides substantial advantages over previously known transformers used with welding apparatus, especially those attempted to be used with robotic equipment.

Having thus described my invention, many modifications thereto will become apparent to those skilled in the art to which it pertains without departing from the scope and spirit of the present invention as defined in the appended claims.

What is claimed is:

1. A linear transformer comprising:
    a core having two substantially C-shaped portions, each portion having first and second shanks extending in a parallel relationship from a base leg, the ends of said first and second shanks of one portion abutting against the ends of said first and second shanks, respectively, of the other portion, to form a closed loop core;
    a secondary winding wrapped around said first shanks of said core portions;
    a primary winding coaxially wrapped about said secondary winding substantially the same length as said secondary winding;
    a coating of electrically insulating material encapsulating said windings and said first shanks of said core sections;
    wherein said secondary winding comprises a monolithic, single turn winding.

2. The invention as defined in claim 1 wherein said secondary winding comprises a sheet of electrically conducting material.

3. The invention as defined in claim 2 wherein said secondary winding includes a projecting tab at each opposing side of said sheet.

4. The invention as defined in claim 3 wherein said tabs are disposed intermediate the axial ends of said sheet.

5. In combination with a robotic welder having a single arm, positive and negative welding electrodes mounted at one end of said arm, and means for controlling movement of said arm including an electric power source, the improvement comprising a transformer mounted to said arm adjacent to said end,
    wherein said transformer comprises;
    a core having two substantially C-shaped portions, each portion having first and second shanks extending in a parallel relationship from a base leg, the ends of said first and second shanks of one portion abutting against the ends of said first and second shanks, respectively, of the other portion, to form a closed loop core;
    a secondary winding wrapped around said first shanks of said core portions;
    a primary winding coaxially wrapped about said secondary winding substantially the same length as said secondary winding;
    a coating of electrically insulating material encapsulating said windings and said first shanks of said core section; and
    wherein said secondary winding comprises a monolithic, single turn winding.

6. The invention as defined in claim 5 and further comprising means for electrically connecting said primary winding to the electric power source.

* * * * *